US012770580B2

(12) United States Patent
Bae et al.

(10) Patent No.: US 12,770,580 B2
(45) Date of Patent: Oct. 20, 2026

(54) DATA TRANSMISSION METHOD AND CONTROLLER

(71) Applicant: BEIJING XIANXIN TECHNOLOGY CO., LTD, Beijing (CN)

(72) Inventors: Jun Cheol Bae, Beijing (CN); Youngjin Lim, Beijing (CN); Chenghui Yan, Beijing (CN)

(73) Assignee: BEIJING XIANXIN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/111,076

(22) PCT Filed: Sep. 15, 2023

(86) PCT No.: PCT/CN2023/119255
§ 371 (c)(1),
(2) Date: Mar. 12, 2025

(87) PCT Pub. No.: WO2024/056093
PCT Pub. Date: Mar. 21, 2024

(65) Prior Publication Data

US 2026/0094579 A1 Apr. 2, 2026

(30) Foreign Application Priority Data

Sep. 16, 2022 (CN) .......................... 202211131140.3

(51) Int. Cl.
*G09G 3/34* (2006.01)
*G09G 3/36* (2006.01)
*G09G 5/00* (2006.01)

(52) U.S. Cl.
CPC ......... *G09G 3/3406* (2013.01); *G09G 3/3685* (2013.01); *G09G 5/003* (2013.01);
(Continued)

(58) Field of Classification Search
CPC .... G09G 3/3406; G09G 3/3685; G09G 5/003; G09G 5/008; G09G 2310/04; G09G 2330/12; G09G 2370/10
See application file for complete search history.

(56) References Cited

U.S. PATENT DOCUMENTS 6,151,334 A * 11/2000 Kim .................... H04L 25/4915 370/542
6,914,637 B1 * 7/2005 Wolf ...................... H04N 19/89 348/476

(Continued)

FOREIGN PATENT DOCUMENTS

CN 101562000 A 10/2009
CN 102097067 A 6/2011

(Continued)

*Primary Examiner* — Mihir K Rayan
(74) *Attorney, Agent, or Firm* — IPro, PLLC

(57) ABSTRACT

The present application provides a data transmission method and a controller. The method is applied to the controller, and specifically comprises: a driving system comprising a controller and a plurality of source drivers, and a first data transmission channel and a second data transmission channel each being arranged between the controller and each source driver. The controller obtaining image data corresponding to each source driver and local dimming data corresponding to each source driver, and transmitting image data to each source driver via the first data transmission channels; and transmitting the local dimming data to each source driver via the first data transmission channels or the second data transmission channels. The method of the present application synchronously transmits image data and local dimming data, enhancing data transmission stability and making picture quality display more ideal.

18 Claims, 13 Drawing Sheets

(52) U.S. Cl.
CPC ......... *G09G 5/008* (2013.01); *G09G 2310/04* (2013.01); *G09G 2330/12* (2013.01); *G09G 2370/10* (2013.01)

(56) References Cited

U.S. PATENT DOCUMENTS

| | | | | |
|---|---|---|---|---|
| 2007/0002000 | A1 | 1/2007 | Kwon | |
| 2009/0184917 | A1 | 7/2009 | Park et al. | |
| 2009/0284509 | A1* | 11/2009 | Choe | G09G 3/3685 345/208 |
| 2011/0148748 | A1* | 6/2011 | Lee | G09G 3/3611 345/102 |
| 2013/0050298 | A1* | 2/2013 | Su | G09G 3/3611 345/691 |
| 2016/0125840 | A1* | 5/2016 | Oh | G09G 5/006 345/76 |
| 2016/0284313 | A1* | 9/2016 | Lin | G09G 5/18 |
| 2017/0132966 | A1* | 5/2017 | Lim | G09G 5/008 |
| 2019/0147831 | A1* | 5/2019 | Lee | G09G 3/20 345/691 |
| 2021/0366417 | A1 | 11/2021 | Ishii et al. | |
| 2023/0154421 | A1* | 5/2023 | Leong | G09G 3/3426 345/691 |

FOREIGN PATENT DOCUMENTS

| | | | |
|---|---|---|---|
| CN | 112397015 | A | 2/2021 |
| CN | 113689832 | A | 11/2021 |
| CN | 114299885 | A | 4/2022 |
| CN | 115424594 | A | 12/2022 |
| EP | 2037441 | A2 | 3/2009 |
| KR | 20130142841 | A | 12/2013 |
| TW | 201447851 | A | 12/2014 |

* cited by examiner

DATA TRANSMISSION METHOD AND CONTROLLER

CROSS-REFERENCES TO RELATED APPLICATIONS

The present application is a National Stage of International Application No. PCT/CN2023/119255, filed on Sep. 15, 2023, which claims priority to Chinese patent application No. 202211131140.3, filed with China National Intellectual Property Administration on Sep. 16, 2022, the entire contents of which are incorporated herein by reference.

TECHNICAL FIELD

The present application relates to the field of communication technology, and in particular to a data transmission method and controller.

BACKGROUND

At present, light-emitting diodes (referred to as LED) are often used in liquid crystal display devices to be produced as backlight units to enhance the display effect.

The main control module (System on a Chip, referred to as SoC) of the liquid crystal display device sends image data to the controller through the eDP protocol, and the controller (Timing Controller, referred to as TCON) transmits image data to the source driver (Source Driver IC, referred to as SDIC) through the P2P protocol to control the display panel. The main control module directly or indirectly transmits local dimming data to the Dimming Controller (DCON) via SPI protocol, and the Dimming Controller transmits local dimming data to the backlight unit to drive the LED driver and thus control the backlight unit.

With the data transmission method of the prior art, it is difficult to synchronize the image data with the local dimming data, and it is difficult to realize the unsatisfactory picture quality display.

SUMMARY

The present application provides a data transmission method and a controller for solving a problem of unsatisfactory picture quality display.

An embodiment of the present application provides a data transmission method, performed by a controller, where the controller and a plurality of source drivers are included in a drive system, a first data transmission channel is provided between the controller and each of the source drivers, and the method includes: obtaining, by the controller, image data corresponding to each of the source drivers and local dimming data corresponding to each of the source drivers; and transmitting, by the controller, the image data to each of the source drivers via the first data transmission channel and the local dimming data to each of the source drivers via the first data transmission channel.

An embodiment of the present application provides a data transmission method, performed by a controller, where the controller and a plurality of source drivers are included in a drive system, a first data transmission channel and a second data transmission channel are provided between the controller and each of the source drivers, and the method includes: obtaining, by the controller, image data corresponding to each of the source drivers and local dimming data corresponding to each of the source drivers; and transmitting, by the controller, the image data to each of the source drivers via the first data transmission channel and the local dimming data to each of the source drivers via the second data transmission channel.

Another embodiment of the present application provides a controller, including: a processor, and a memory communicatively connected to the processor; where the memory is configured to store computer execution instructions; and the processor is configured to execute the computer execution instructions stored in the memory to implement the method in any of the above embodiments.

The present application provides a data transmission method and a controller, where the controller transmits the image data to the source driver via the first data transmission channel, and the controller transmits the local dimming data to the source driver via the first data transmission channel or the second data transmission channel, without the need to set up a separate controller for transmitting the image data, and without the need to set up a separate dimming controller for transmitting the local dimming data, such that the local dimming data and the image data do not need to be transmitted using two different data protocols, so that the local dimming data and the image data are transmitted synchronously to improve the display quality.

BRIEF DESCRIPTION OF FIGURES

The accompanying drawings herein, which are incorporated into and form a part of the specification, illustrate embodiments conforming to the present application and are used in conjunction with the specification to explain the principles of the present application.

Drawing marks: 110, a master control module; 120, a controller; 121, a lock signal line; 130, a dimming controller; 140, a source driver; 150, a liquid crystal panel; 160, a backlight unit; T1, a first transistor; T2, a second transistor; 191, a first transmitter; 192, a first receiver; 194, a second transmitter; 193, a second receiver; 201, a LED region; 202, a dimming region; 203, pixel; D1, first data packet; D2, second data packet; D3, third data packet; DH1, first packet header; DB1, first packet body; DH2, second packet header; DB2, second packet body; DH3, third packet header; DB3, third packet body; SOL, start identifier; EOL, end identifier; 301, first data transmission channel; 302, second data transmission channel.

Definite embodiments of the present application have been shown by means of the above-described accompanying drawings, which will be described in greater detail later. These accompanying drawings and textual descriptions are not intended to limit the scope of the present application idea in any way, but rather to illustrate the concepts of the present application for those skilled in the art by reference to particular embodiments.

DETAILED DESCRIPTION

Exemplary embodiments will be described herein in detail, examples of which are represented in the accompanying drawings. When the following description relates to the accompanying drawings, the same numerals in the different accompanying drawings indicate the same or similar elements unless otherwise indicated. The embodiments described in the following exemplary embodiments do not represent all embodiments consistent with the present application. Rather, they are only examples of devices and methods consistent with some aspects of the present application as detailed in the appended claims.

In a liquid crystal display device, in addition to the liquid crystal panel 150 displaying an image, a backlight unit 160 (referred to as BLU) is usually made using LEDs to enhance the display effect.

Figure 1:
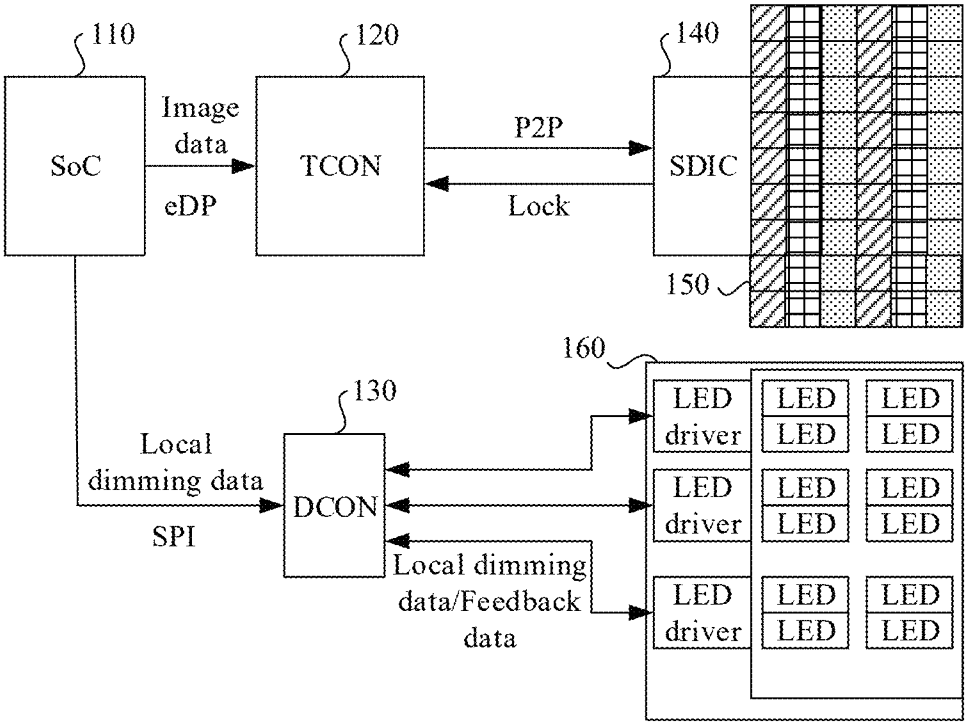
FIG. 1 is a schematic diagram of a drive system of a liquid crystal display device.

As shown in FIG. 1, a drive system of a liquid crystal display device includes a master control module 110, a controller 120, a dimming controller 130, and a source driver 140. The master control module 110 transmits image data to the controller 120 via an eDP protocol, and the controller 120 transmits the image data to the source driver 140 via a data transmission channel based on a P2P protocol, thereby driving the liquid crystal panel 150, and receives feedback data from the source driver 140 via a lock signal transmission channel. The master control module 110 transmits local dimming data to the dimming controller 130 via the SPI protocol, and the dimming controller 130 transmits the local dimming data to the LED driver within the backlight unit 160 to drive the LEDs by the LED driver within the backlight unit 160, and in addition the dimming controller 130 receives feedback data from the backlight unit 160.

Figure 2:
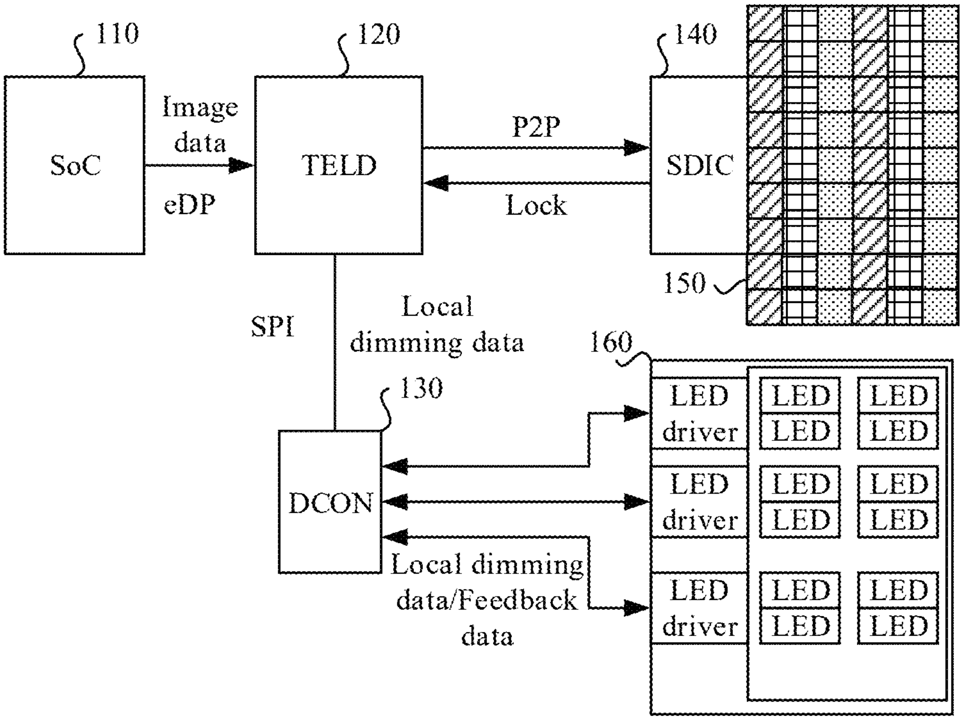
FIG. 2 is a schematic diagram of a drive system of another liquid crystal display device.

Again, as shown in FIG. 2, the master control module 110 transmits image data to the controller 120 via the eDP protocol, the controller 120 itself can generate the local dimming data, and this type of controller 120 is referred to as TELD (TCON Embedded Local Dimming). The TELD transmits the image data to the source driver 140 via a data transmission channel based on the P2P protocol to drive the liquid crystal panel 150 and receives the feedback data from the source driver 140 via the lock signal transmission channel. The TELD generates the local dimming data based on the image data using the dimming algorithm and transmits the local dimming data to the dimming controller 130 through the Serial Peripheral Interface (SPI). The dimming controller 130 transmits the local dimming data to the LED driver, the LEDs are driven by the LED driver within the backlight unit 160, and in addition, the dimming controller 130 receives feedback data from the backlight unit 160.

Figure 3:
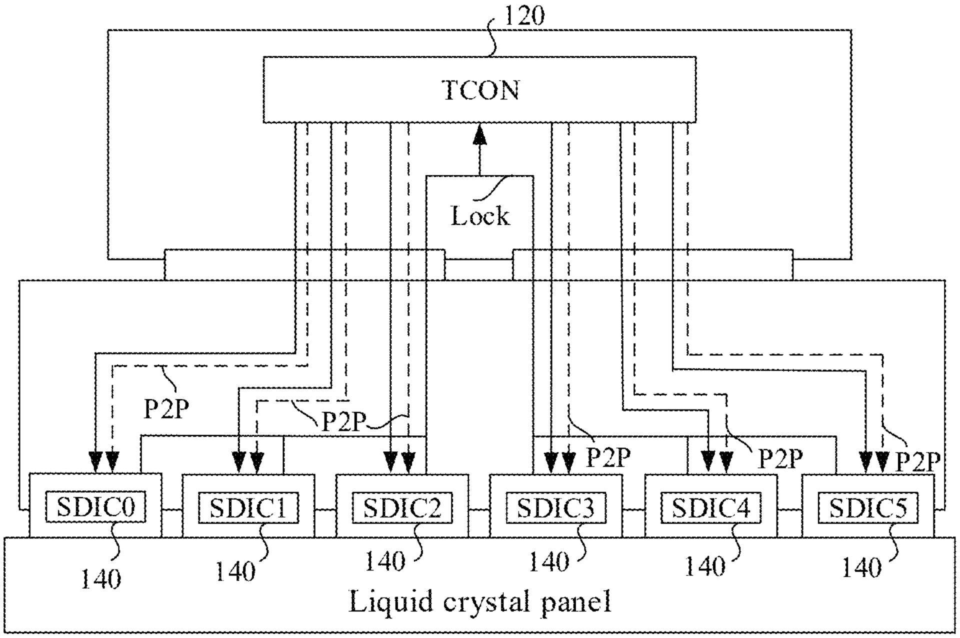
FIG. 3 is a schematic diagram of a drive system of yet another liquid crystal display device.

As shown in FIG. 3, the source drivers 140 may be multiple, for example, six source drivers 140 are provided in the liquid crystal display device, and are labeled sequentially as a first source driver SDIC0, a second source driver SDIC1, a third source driver SDIC2, a fourth source driver SDIC3, a fifth source driver SDIC4, and a sixth source driver SDIC5.

Each source driver 140 drives a plurality of rows of pixels 203 in the liquid crystal panel 150, and a data transmission channel and a lock signal transmission channel based on a P2P protocol are provided between the controller 120 and each source driver 140.

In FIG. 3, the dashed line between each source driver 140 and the controller 120 indicates the data transmission channel based on the P2P protocol, and the solid line between them indicates the lock signal transmission channel.

Figure 4:
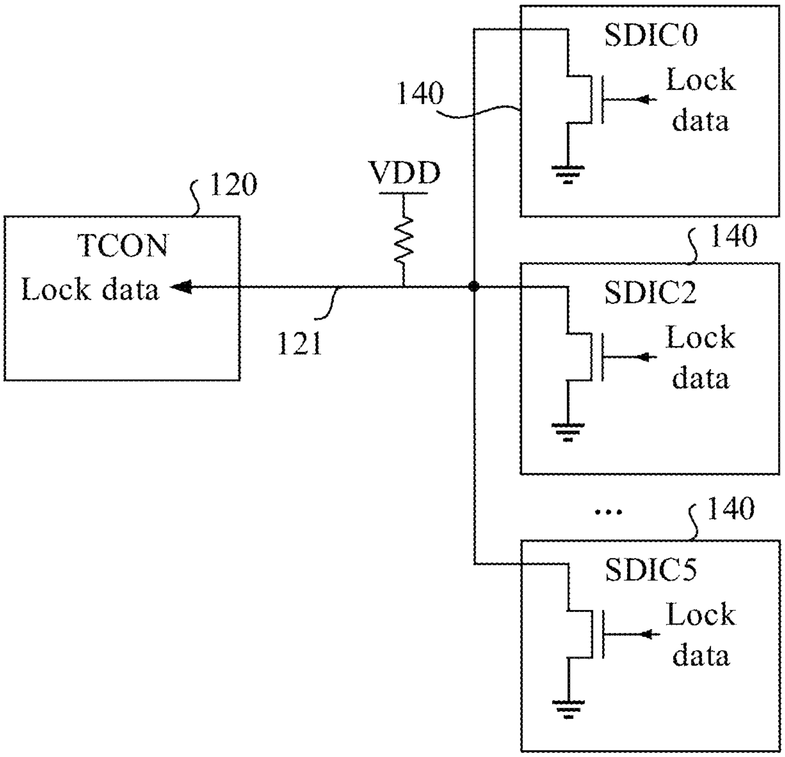
FIG. 4 is a schematic diagram of a lock signal transmission channel between a controller and a source driver in the liquid crystal display device shown in FIG. 3.

As shown in FIG. 4, one transistor is provided within each source driver 140, a source of the transistor is connected to a ground terminal, and a drain of the transistor is connected to a lock signal line 121, which serves as the lock signal transmission channel. In the event of an abnormal reception of image data within any one of the source drivers 140, lock data is generated to cause the transistor to be turned on, the lock signal on the lock signal line 121 is driven to be at a low level, and the controller 120 detects the lock signal on the lock signal line 121 in real time. When the lock signal is at the low level, the controller 120 knows that the transmission of the image data is abnormal, and then it can re-send the image data.

Due to the separate setting of the dimming controller 130, the local dimming data and the image data are transmitted using two different data protocols, and both the image data and the local dimming data are difficult to be synchronized, resulting in poor picture quality of the liquid crystal display.

In response to the above problems, the present application proposes a data transmission method and a controller 120, which is technically conceived as follows: the dimming controller 130 is no longer separately set up, and the liquid crystal panel 150 and the backlight unit 160 are driven by source drivers 140. The controller 120 has a function of generating local dimming data, the controller 120 transmits the image data and the local dimming data to each of the source drivers 140, the source drivers 140 drive the liquid crystal panel 150 based on the image data, the source drivers 140 drive the backlight unit 160 based on the local dimming data, and the source drivers 140 are also required to feed operation state data of the backlight unit 160 back to the controller 120.

Figure 5:
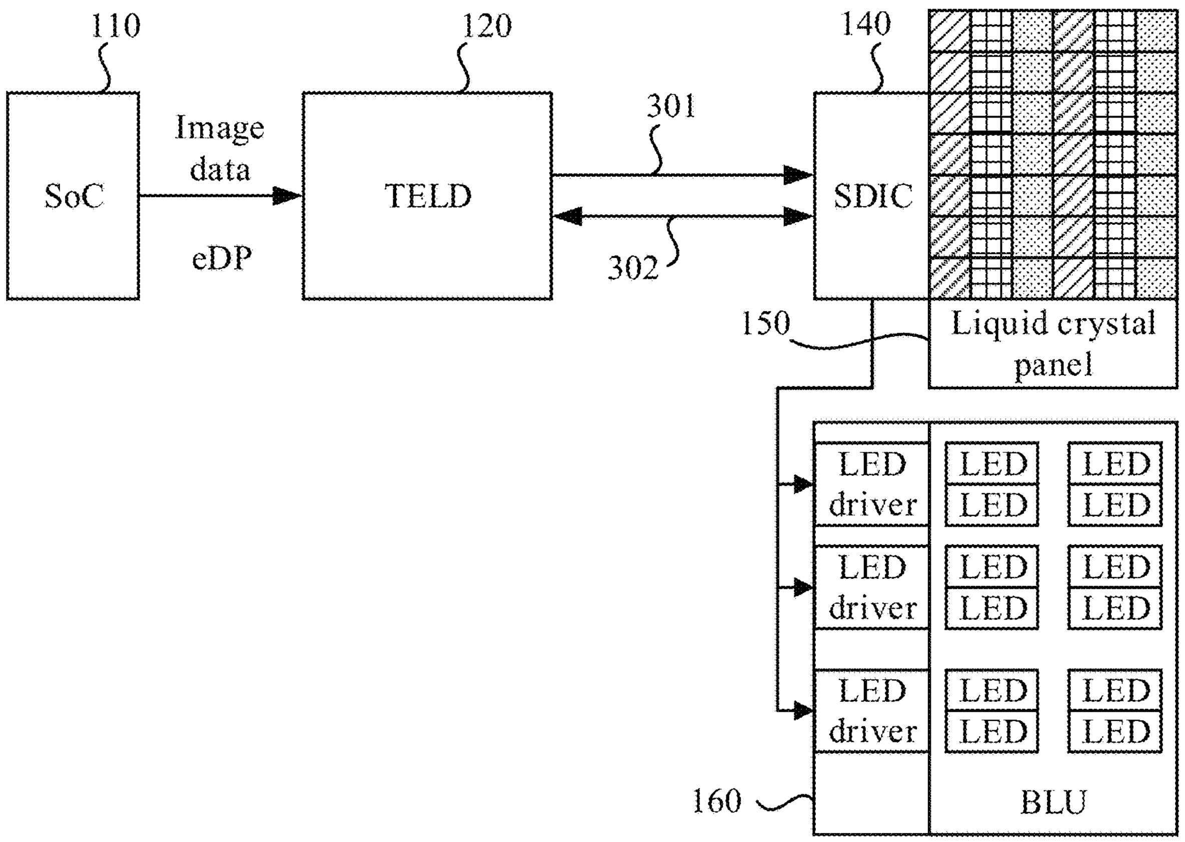
FIG. 5 is a schematic diagram of a drive system of a liquid crystal display device provided by an embodiment of the present application.

As shown in FIG. 5, an embodiment of the present application provides a drive system, the drive system including a master control module 110, a controller 120, and a plurality of source drivers 140 (only one is shown in the figure).

The master control module 110 transmits image data to the controller 120 via the eDP protocol, and the controller 120 processes the image data using a dimming algorithm to obtain local dimming data corresponding to each source driver 140. A first data transmission channel 301 and a second data transmission channel 302 are provided between the controller 120 and each source driver 140.

Each source driver 140 is connected to the backlight unit 160. Each source driver 140 is also connected to the liquid crystal panel 150. The source driver 140 is used to drive the liquid crystal panel 150, and the source driver 140 is also used to drive each LED driver in the backlight unit 160, and the LED driver drives the LEDs in the backlight unit 160.

In some embodiments, the first data transmission channel 301 is used for transmitting image data, and the second data transmission channel 302 is used for transmitting operation state data of the backlight unit 160 and local dimming data.

In some embodiments, the first data transmission channel 301 is used for transmitting both image data and local dimming data. The second data transmission channel 302 is used for transmitting the operation state data of the backlight unit 160.

In some embodiments, the first data transmission channel 301 is a data transmission channel based on the P2P protocol, and the second data transmission channel 302 is the lock signal transmission channel.

In some embodiments, the second data transmission channel 302 is configured as a bi-directional transmission in order to enable the source driver 140 to transmit the operation state data of the backlight unit 160 to the controller 120. The structure of the second data transmission channel 302 between the controller 120 and each source driver 140 is shown in FIGS. 6A and 6B.

Figure 6A:
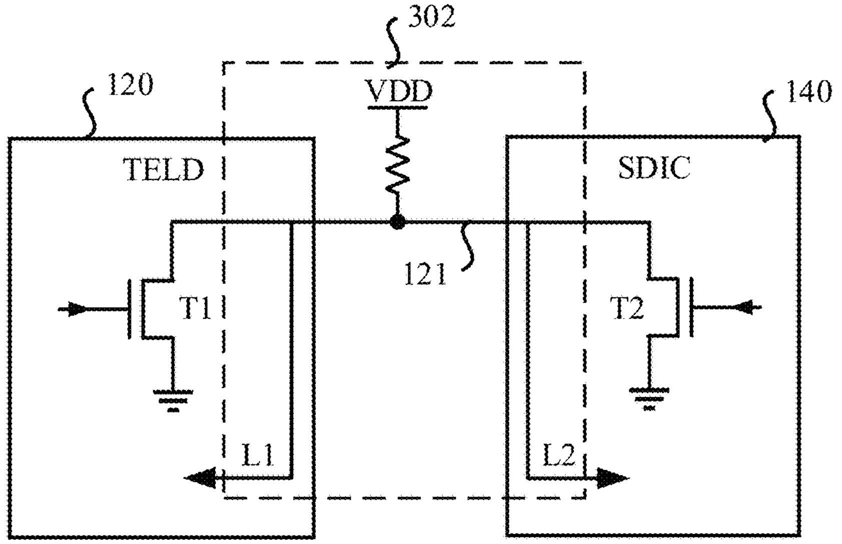
FIG. 6A is a schematic diagram of a lock signal transmission channel between a controller and a source driver in the drive system shown in FIG. 5.

In FIG. 6A, in addition to a second transistor T2 provided within each source driver 140, a first transistor T1 is also provided within the controller 120. A source of the first transistor T1 within the controller 120 is grounded, a drain thereof is connected to the lock signal line 121, the lock signal line 121 is a single line, and a first input line L1 is introduced from the lock signal line 121. The first input line L1 is used to receive data, e.g., feedback data. A source of the second transistor T2 within the source driver 140 is grounded, a drain thereof is connected to the lock signal line 121, and a second input line L2 is introduced from the lock signal line 121. The second input line L2 is used to receive data, e.g., a feedback request, dimming control data, or local dimming data.

Figure 6B:
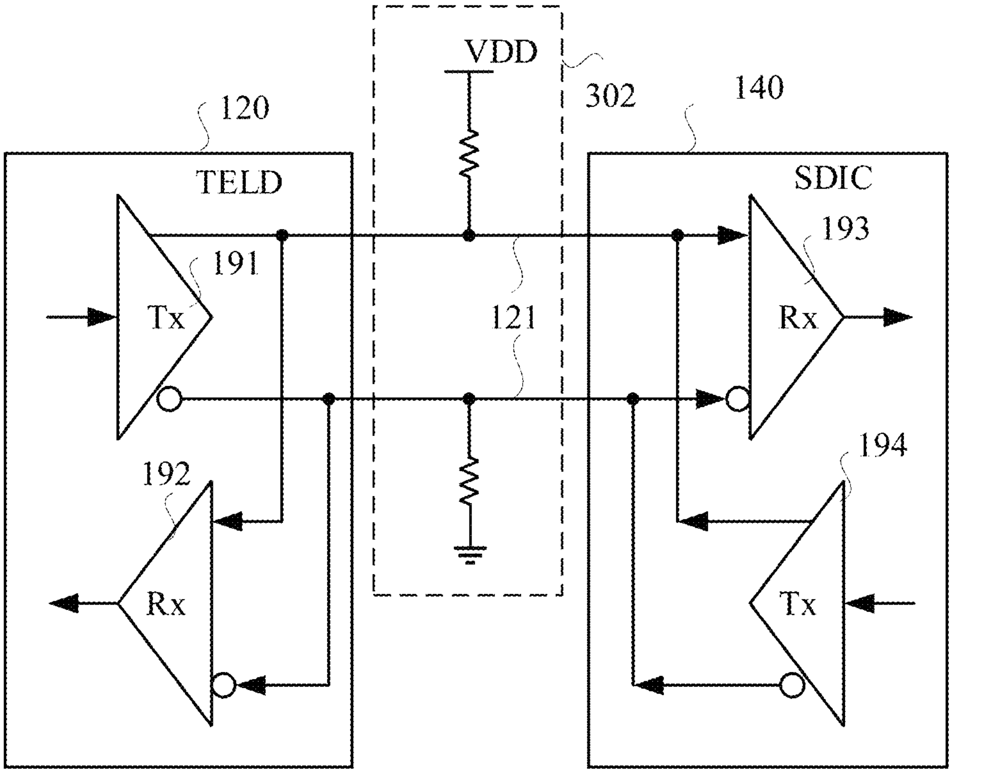
FIG. 6B is another schematic diagram of a lock signal transmission channel between a controller and a source driver in the drive system shown in FIG. 5.

In FIG. 6B, a lock signal line 121 is provided between the controller 120 and each source driver 140, the lock signal line 121 is a differential line, and the lock signal line 121 serves as a second data transmission channel 302. A first transmitter 191 and a first receiver 192 are provided within the controller 120, and a second transmitter 194 and a second receiver 193 are provided within each source driver 140. An output terminal of the first transmitter 191 is connected to the lock signal line 121, and an input terminal of the first receiver 192 is connected to the lock signal line 121, and the first transmitter 191 is used to send data, e.g., a feedback request, dimming control data, or local dimming data, to the second receiver 193. An output terminal of the second transmitter 194 is connected to the lock signal line 121, an input terminal of the second receiver 193 is connected to the lock signal line 121, and the second transmitter 194 is used to send data, e.g., feedback data, to the first receiver 192.

Figure 7:
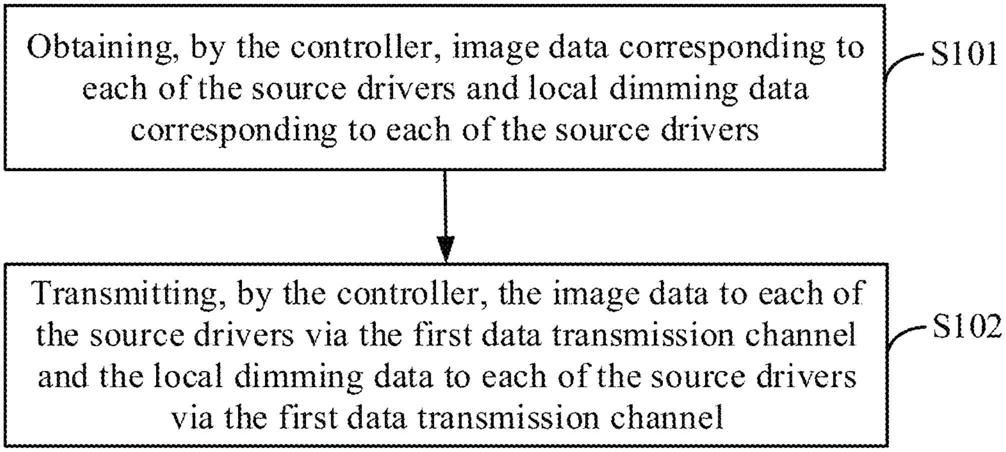
FIG. 7 is an interaction flowchart of a data transmission method provided in an embodiment of the present application.

As shown in FIG. 7, an embodiment of the present application provides a data transmission method, the data transmission method is applied to a drive system, and the method includes the following.

S101, the controller obtains image data corresponding to each source driver and local dimming data corresponding to each source driver.

The data transmission is performed between the controller and the plurality of source drivers, and the controller, in obtaining the image data of the entire liquid crystal panel 150, needs to divide the image data of the entire liquid crystal panel 150 according to the pixels driven by each of the source drivers, to obtain the image data corresponding to each of the source drivers.

The controller processes the image data corresponding to each source driver using a dimming algorithm to obtain the local dimming data corresponding to each source driver.

S102, the controller transmits the image data to each source driver via the first data transmission channel 301 and the local dimming data to each source drivers via the first data transmission channel 301.

In some embodiments, the controller transmits both the image data and the local dimming data to each source driver via the first data transmission channel 301.

In some embodiments, the first data transmission channel 301 may be a data transmission channel based on a P2P protocol. The controller transmits both image data and local dimming data to each source driver via the P2P protocol-based data transmission channel.

With the data transmission method of the present application, the controller transmits the image data and the local dimming data to each source driver via the first data transmission channel 301, without the need to set up a separate dimming controller 130 for transmitting the local dimming data, and without the need to use two different data protocols for transmitting the local dimming data and the image data, such that the local dimming data and the image data can be transmitted synchronously to improve the display quality.

An embodiment of the present application provides a data transmission method, the data transmission method is applied to a drive system, and the method includes the following.

S401, the controller obtains image data corresponding to each source driver and local dimming data corresponding to each source driver.

S402, the controller transmits the image data to each source driver via a first data transmission channel 301 and the local dimming data to each source driver via a second data transmission channel 302.

In some embodiments, the first data transmission channel 301 is a data transmission channel based on a P2P protocol, and the second data transmission channel 302 is a lock signal transmission channel.

In some embodiments, the controller transmits image data to each source driver via the P2P protocol-based data transmission channel, and the controller transmits local dimming data to each source driver via the lock signal transmission channel.

With the data transmission method of the present application, the controller transmits the image data to each source driver via the first data transmission channel 301, and the controller transmits the local dimming data to each source driver via the second data transmission channel 302, without the need to set up a separate dimming controller 130 for transmitting the local dimming data, and without the need to use two different data protocols for transmitting the local dimming data and the image data, such that the local dimming data and the image data can be transmitted synchronously to improve the display quality.

Figure 8:
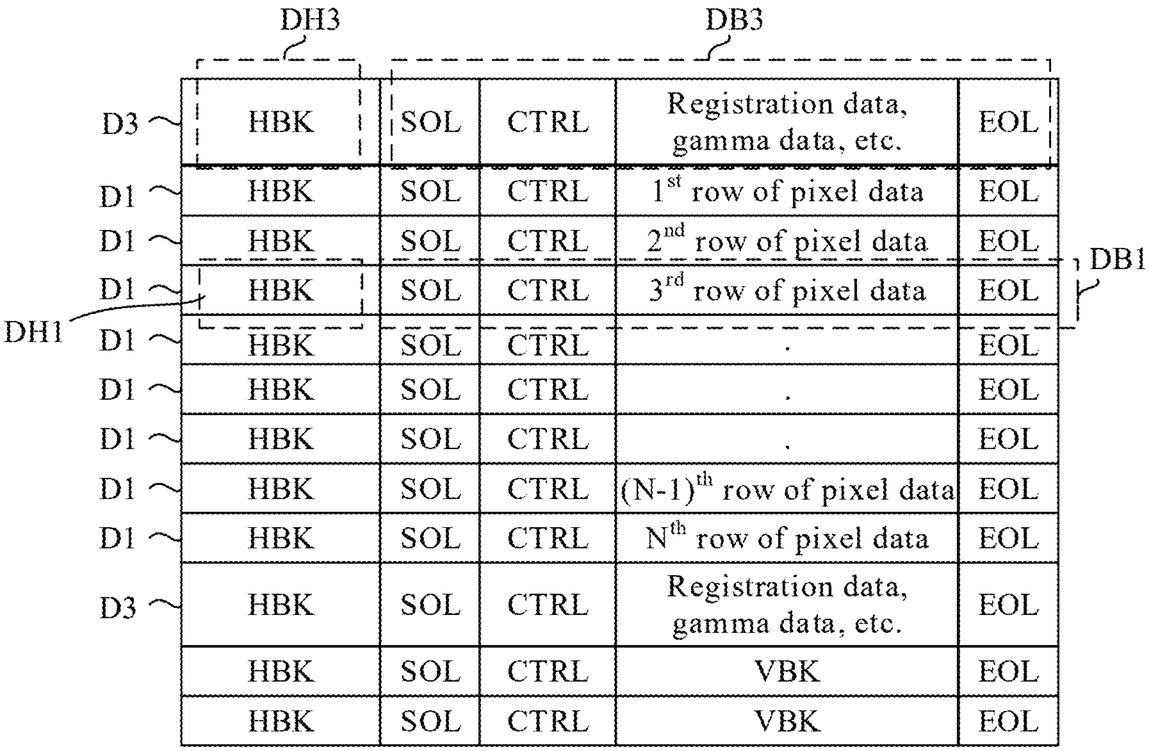
FIG. 8 is a schematic diagram of a data structure based on a P2P protocol.

In some embodiments, when the image data is transmitted via only the first data transmission channel 301, a data packet structure of the image data transmitted between the controller and a source driver is shown in FIG. 8.

A plurality of third data packets D3 and a plurality of first data packets D1 are included within the data packets of the image data, the first data packets D1 are located in the middle of the image data, and the third data packets D3 are located in the head and tail of the image data.

The third data packet D3 includes registration data, gamma data, and the like, and the source driver is configured based on the registration data to drive the liquid crystal panel 150, or the source driver performs gamma correction based on the gamma data when driving the liquid crystal panel 150. Each first data packet D1 includes pixel data for one row of pixels 203 in the liquid crystal panel 150.

The first data packet D1 including the pixel data of the previous row is disposed behind the first data packet D1 including the pixel data of the next row. At least one third data packet D3 precedes the first data packet D1 including pixel data of the first row. At least one third data packet D3 follows the first data packet D1 including pixel data of the last row.

The third data packet D3 includes a third packet header DH3 and a third packet body DB3. The third packet body DB3 includes a start identifier SOL, control data CTRL, content data, and an end identifier EOL. The content data includes registration data, gamma data, and the like.

The first data packet D1 includes a first packet header DH1 and a first packet body DB1. The first packet body DB1 includes a start identifier SOL, control data CTRL, content data, and an end identifier EOL. The content data includes pixel data for each row.

In some embodiments, the controller transmits image data to each source driver via the first data transmission channel 301, and transmits local dimming data to each source driver via the first data transmission channel 301, including: the controller transmits a mixed data packet to each source driver via the first data transmission channel 301. The mixed data packet includes the image data and the local dimming data.

In the above technical solution, the image data and the local dimming data corresponding to the source driver are packaged into the mixed data packet, and the controller transmits the mixed data packet to each source driver via the first data transmission channel 301 to ensure synchronized transmission of the image data and the local dimming data.

In some embodiments, the controller transmits the mixed data packet to each source driver via a data transmission channel based on a P2P protocol.

Figure 10:
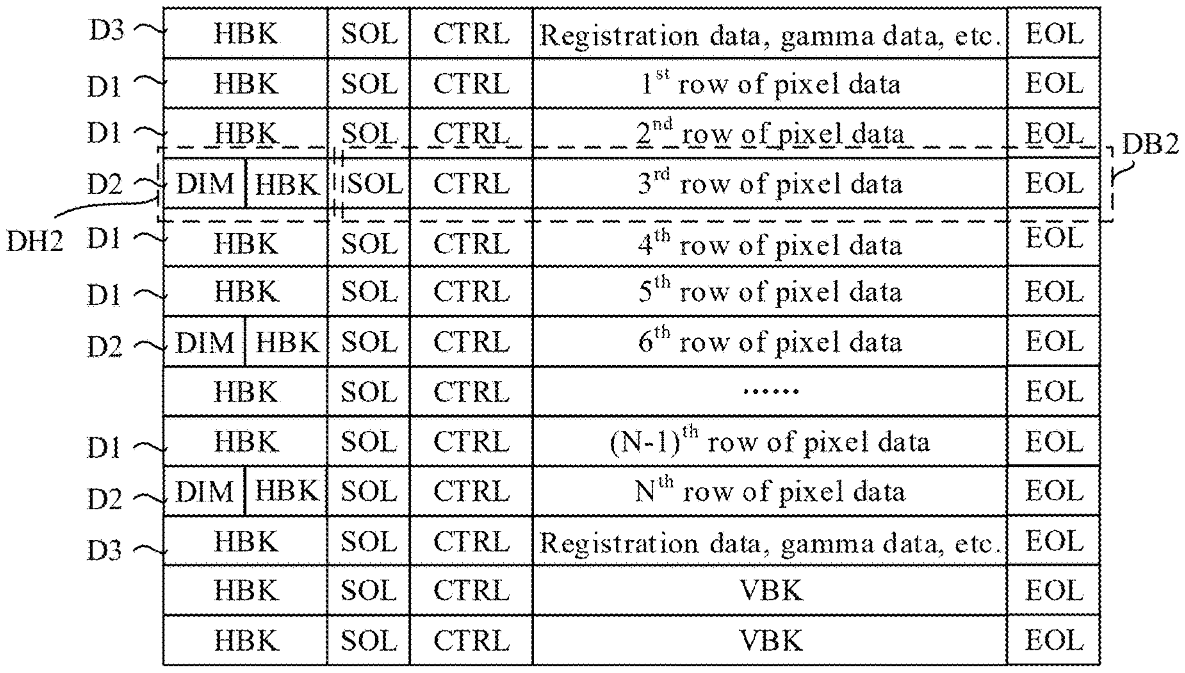
FIG. 10 is a schematic diagram of another data structure based on a P2P protocol.
Figure 11:
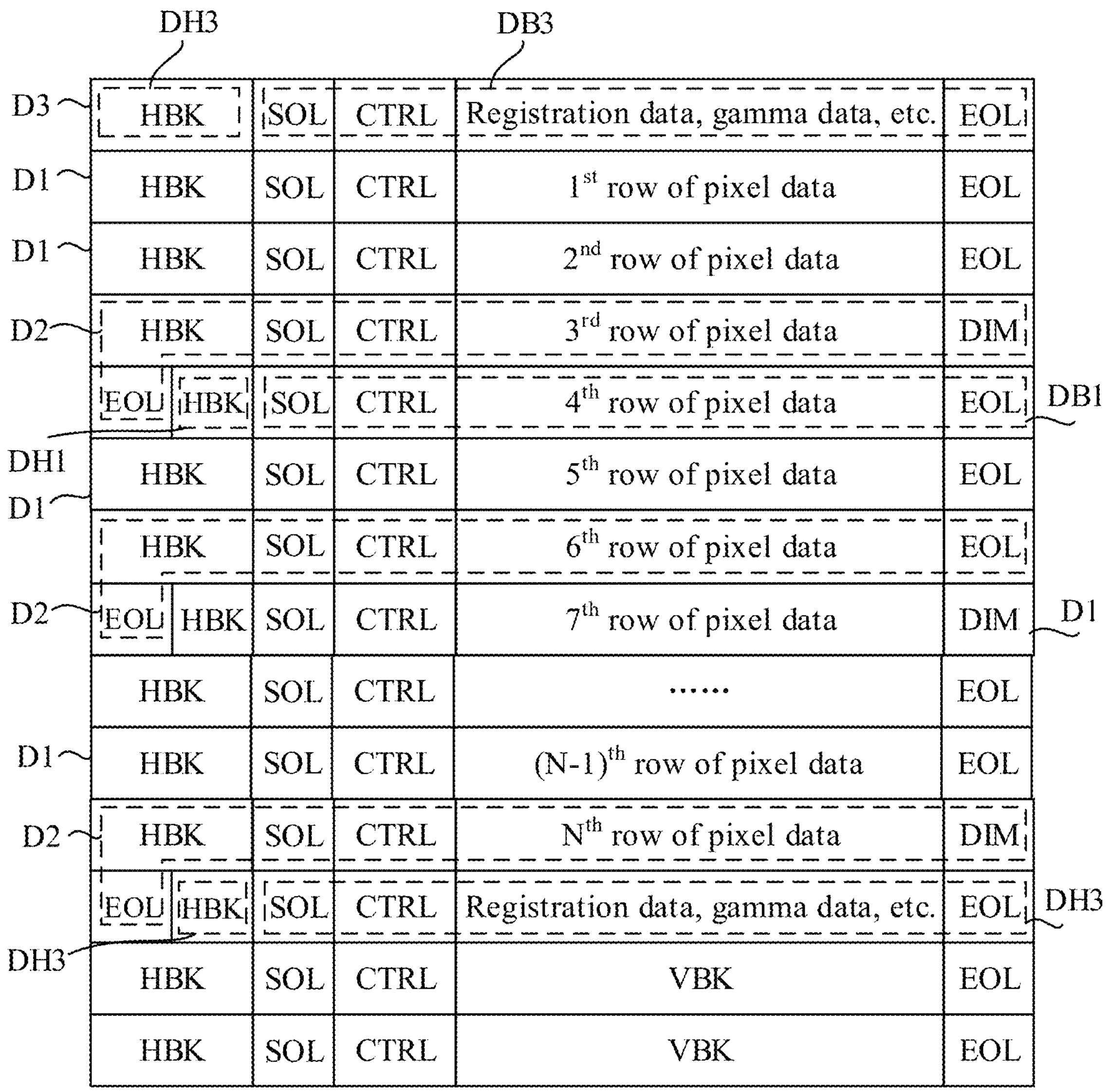
FIG. 11 is a schematic diagram of yet another data structure based on a P2P protocol.

In some embodiments, as shown in FIGS. 10 and 11, a plurality of sub-data packets are included within the mixed data packet. Each sub-data packet includes a plurality of first data packets D1 and a second data packet D2. The second data packet D2 is located at the head of the sub-data packet or may also be located at the tail of the sub-data packet.

It should be understood that the first data packet D1 may be data including the image data, and the second data packet D2 may be data including the image data and the local dimming data.

In some embodiments, the number of first data packets D1 in each sub-data packet may be the same or may be different, without limitation herein.

In some embodiments, the mixed data packet further includes a plurality of third data packets D3, some of the third data packets D3 are located before the first sub-data packet, and some other of the third data packets D3 are located behind the last sub-data packet.

In some embodiments, each first data packet D1 includes pixel data of a row of pixels, and each second data packet D2 includes pixel data of a row of pixels.

In some embodiments, each sub-data packet contains pixel data of a plurality of consecutive rows, and any two sub-data packets contain pixel data of different rows of pixels. The sub-data packets are ordered in relation to the positions of the pixel rows, with sub-data packets corresponding to pixel rows located in front being after sub-data packets corresponding to pixel rows located behind.

In some embodiments, the second data packet D2 is located at the tail of the sub-data packet. A third data packet D3 is provided before the first data packet D1 that includes pixel data of the first row. A third data packet D3 is provided after the second data packet D2 that includes pixel data of the last row.

Figure 9:
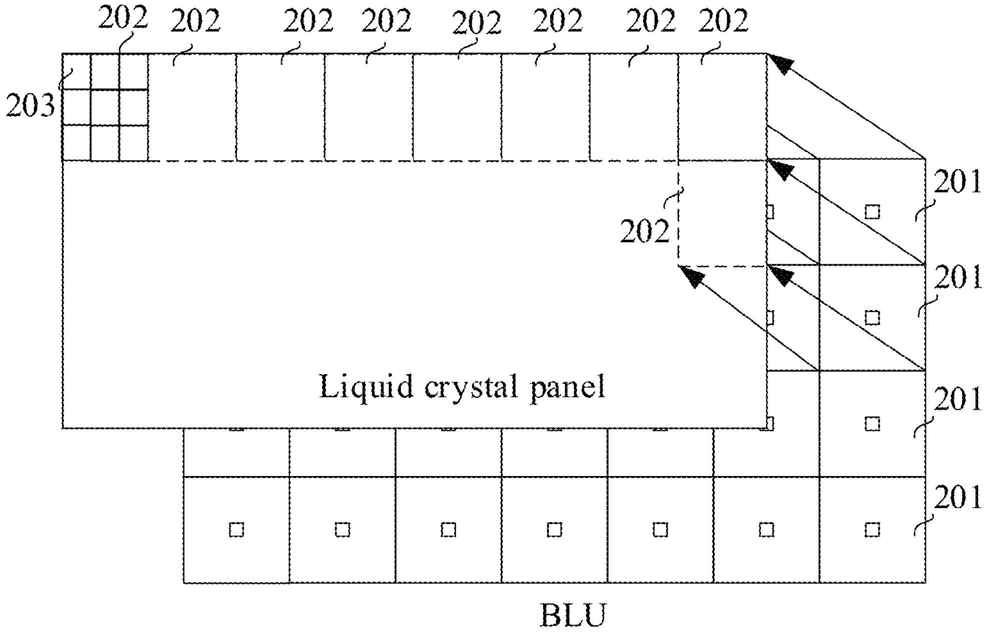
FIG. 9 is a schematic diagram of a liquid crystal panel and a backlight unit.

In some embodiments, as shown in FIG. 9, the liquid crystal panel 150 includes a plurality of dimming regions 202. The dimming regions 202 include a plurality of pixels 203 arranged in an array, and the backlight unit is subdivided into a plurality of LED regions 201. Each LED region includes a plurality of LEDs, and each LED serves as a backlight source. Each LED region 201 coincides with a projection of the corresponding dimming region 202 on that LED region 201.

In some embodiments, a plurality of rows of pixels form a plurality of dimming regions 202. Referring to FIG. 9, three rows of pixels form 8 dimming regions 202.

In some embodiments, the plurality of dimming regions 202 controlled by the image data included in the sub-data packets are called a display region, the region where the plurality of backlight sources, which are controlled by the local dimming data included in the sub-data packets, are located is called a backlight region, and the projection of the dimming regions 202 on the backlight region coincides with the backlight region. By this setting, the backlight region controlled by the local dimming data within the sub-data packets is used to enhance the display region controlled by the image data, facilitating the synchronized transmission of the image data and the local dimming data, and further enhancing the display picture quality.

For example, in FIGS. 10 and 11, there are N rows of pixels, Nis a multiple of 3, and the number of first data packets D1 within each sub-data packet is the same. The first sub-data packet has a first data packet D1 containing pixel data of the first row, a first data packet D1 containing pixel data of the second row, and a second data packet D2 containing pixel data of the third row. The second sub-data packet has a first data packet D1 containing pixel data of the fourth row, a first data packet D1 containing pixel data of the fifth row, and a second data packet D2 containing pixel data of the sixth row, and so on, the $k^{th}$ sub-data packet has a first data packet D1 containing pixel data of the $(3k-2)^{th}$ row, a first data packet D1 containing pixel data of the $(3k-1)^{th}$ row, and a second data packet D2 containing pixel data of the $(3k)^{th}$ row.

The plurality of dimming regions 202 corresponding to the pixel data contained in the $k^{th}$ sub-data packet is called the display region. The region where the plurality of backlighting light sources, corresponding to the local dimming data contained in the $k^{th}$ sub-data packet, are located is referred to as the backlight region. The projection of the display region on the backlight region coincides with the backlight region.

Referring to FIG. 9, the first sub-data packet contains pixel data of the first row to pixel data of the third row, the first sub-data packet contains local dimming data controlling LEDs within the first row of LED regions 201, the first row of dimming regions 202 is referred to as a display region, the first row of LED regions 201 is referred to as a backlight region, and the projection of the display region on the backlight region coincides with the backlight region.

Each first data packet D1 includes a first packet header DH1 and a first packet body DB1. Each second data packet D2 includes a second packet header DH2, a second packet body DB2, and local dimming data. The first packet body DB1 and the second packet body DB2 have the same structure and both include, in turn, a start identifier SOL, control data CTRL, pixel data, and an end identifier EOL.

In some embodiments, as shown in FIG. 10, in the second data packet D2, the local dimming data is inserted within the second packet header DH2, and the length of the second packet header DH2 after the insertion of the local dimming data is of the same value as the length of the second packet header DH2 before the insertion of the local dimming data. The local dimming data is placed by occupying the position of a free character(s) in the packet header of the second data packet D2, without affecting the image data transmission. Compared to the data structure shown in FIG. 8, after inserting the local dimming data, only the data structure of the second data packet D2 is changed without changing the data structures of the first data packet D1 and the third data packet D3, and the change in the data structure is relatively small, which can be adapted to the existing circuit structure of the controller and the source driver.

In some embodiments, as shown in FIG. 10, the local dimming data may be inserted into the head of the second packet header DH2, and in some embodiments, the local dimming data may be inserted into the tail of the second packet header DH2.

In some embodiments, in the second data packet D2, the local dimming data is inserted within the second packet body DB2, where a length of the second packet body DB2 after insertion of the local dimming data is greater than a first normative value and a length of a packet header within a data packet located behind the second data packet D2 is less than a second normative value, and a total length of the second packet body DB2 of the second data packet D2 after insertion of the local dimming data and the packet header of the data packet located behind the second data packet D2 is a sum of the first normative value and the second normative value.

The first normative value is a length of the second packet body DB2 before insertion of the local dimming data, and the second normative value is a length of the packet header of the data packet located behind the second data packet D2 before insertion of the local dimming data.

By this setting, the local dimming data inserted into the second packet body DB2 occupies the length of the packet header of the data packet located behind the second data packet D2, does not occupy the length of the pixel data within the second packet body DB2, which does not affect the transmission of the image data, and only alters the structure of the data packet located behind the second data packet D2 and the structure of the second data packet D2, has a relatively small effect on the structure of the other data packets, and can be adapted to the existing circuit structure of the controller 120 and the source driver.

In some embodiments, in the second data packet D2, the local dimming data is located behind the pixel data, and by this setting, the impact on the pixel data within the second data packet D2 due to the insertion of the local dimming data can be reduced.

In some embodiments, as shown in FIG. 11, when the data packet is not the last sub-data packet, the data packet behind the second data packet D2 may be the first data packet D1 in the next sub-data packet. The length of the second packet body DB2 after the insertion of the local dimming data is greater than the first normative value, and the length of the first packet header DH1 in the first data packet D1 located behind the second data packet D2 is less than the second normative value, and the total length of the second packet body DB2 of the second data packet D2 and the first packet header DH1 in the first data packet D1 located behind the second data packet D2 is the sum of the first normative value and the second normative value.

In some embodiments, as shown in FIG. 11, when the sub-data packet is the last sub-data packet, the data packet following the second data packet D2 may be a third data packet D3. The length of the second packet body DB2 after insertion of the local dimming data is greater than the first normative value and the length of the third packet header DH3 located in the third data packet D3 following the second data packet D2 is less than the second normative value, and the total length of the second data packet DB2 of the second data packet D2 and the third packet header DH3 in the third data packet D3 located behind the second data packet D2 is the sum of the first normative value and the second normative value.

In the above technical solution, when inserting the local dimming data into the second packet body DB2, the length of the packet header of the first data packet D1 or the third data packet D3 located behind the second data packet D2 is adjusted, and the local dimming data is placed by occupying the position of the free character(s) in the packet header of the first data packet D1 or the third data packet D3, without affecting the image data transmission. Compared to the data structure shown in FIG. 8, the data structure after insertion of the local dimming data changes less and can be adapted to the existing circuit structure of the controller and the source driver.

In some embodiments, as shown in Table 1, the local dimming data includes a dimming start identifier SOL, control data, multiple local dimming sub-data, and a dimming end identifier EOL in timing order.

TABLE 1

| Structure of local dimming data | | | |
|---|---|---|---|
| Dimming start identifier | Control data | Multiple local dimming sub-data | Dimming end identifier |

The control data is used to configure the source driver so that the source driver can control the LED driver. The plurality of local dimming sub-data corresponds one-to-one with the plurality of dimming regions 202 on the same row.

The first local dimming sub-data in the local dimming data is used to control the backlight source in the first dimming region 202 on the same row, the second local dimming sub-data in the local dimming data is used to control the backlight source in the second dimming region 202 on the same row, and so on, and the last local dimming sub-data in the local dimming data is used to control the backlight source in the last dimming region 202 on the same row.

In the above technical solution, by dividing the local dimming data into a plurality of local dimming sub-data, it is convenient for the source driver to decode the local dimming data after receiving the local dimming data, and determine the dimming data corresponding to each local dimming region 202.

Figure 12A:
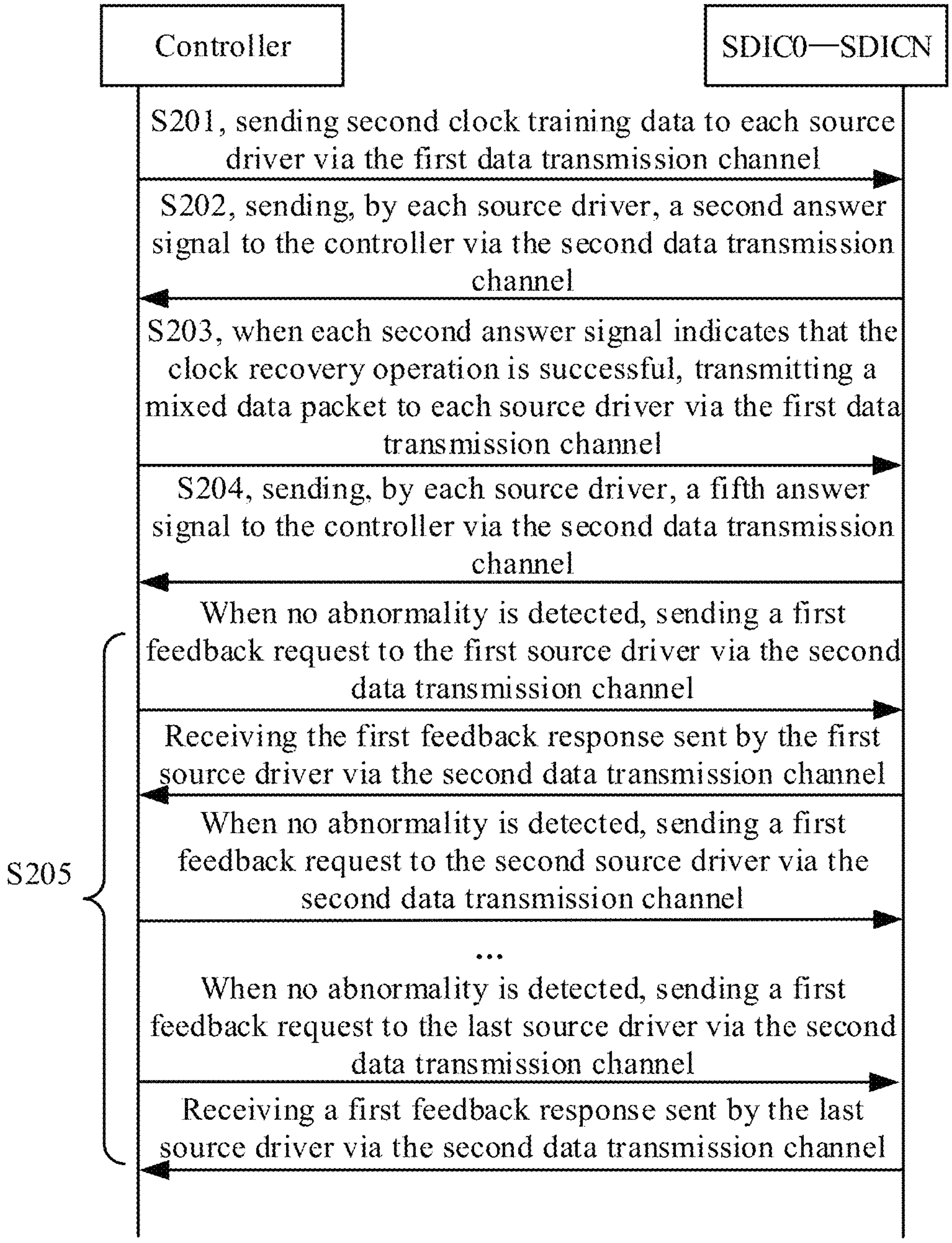
FIG. 12A is an interaction flowchart of a data transmission method provided in an embodiment of the present application.
Figure 13:
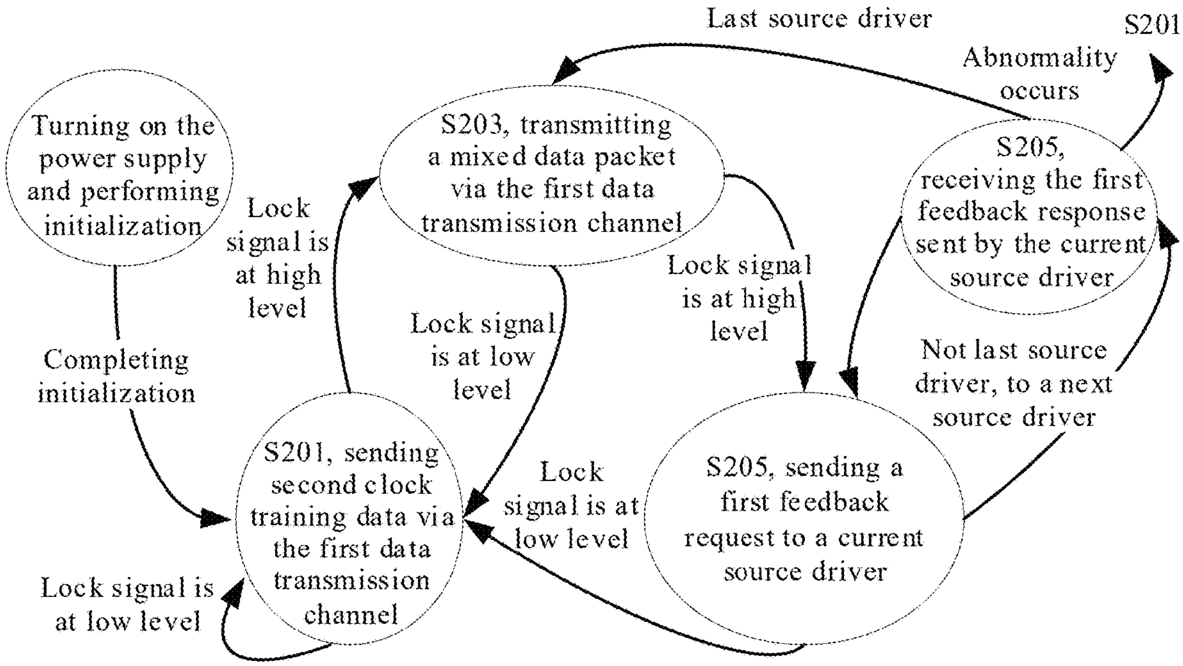
FIG. 13 is a state transition diagram of the data transmission method in the embodiments shown in FIGS. 12A and 12B.

As shown in FIGS. 12A and 13, an embodiment of the present application provides a data transmission method, the data transmission method is applied to a drive system, and the method includes the following.

S201, the controller sends second clock training data to each source driver via the first data transmission channel.

The power supply is turned on and initialization is performed, so that the lock signal on the lock signal line 121 is at a low level.

The controller sends the second clock training data to each source driver via the first data transmission channel 301 to cause each source driver to perform a clock recovery operation.

S202, each source driver sends a second answer signal to the controller via the second data transmission channel.

The second answer signal is output by each source driver after the clock recovery operation is performed, for each source driver, the output second answer signal maintains the lock signal at a high level after the clock recovery operation of the source driver succeeds. When the clock recovery operation of the source driver fails, the output second answer signal causes the lock signal to become at the low level.

S203, when each second answer signal indicates that the clock recovery operation is successful, the controller transmits a mixed data packet to each source driver via the first data transmission channel.

The lock signal on the lock signal line 121 is controlled by all the source drivers jointly or by the controller, and when the second answer signal output by any one of the source drivers causes the lock signal to become at the low level, the lock signal on the lock signal line 121 becomes at the low level. When the second answer signals output by the source drivers each cause the lock signal to become at the high level, the lock signal on the lock signal line 121 maintains at the high level.

With the lock signal on the lock signal line 121 is at the high level, the controller transmits the mixed data packet to each source driver via the first data transmission channel 301.

When the lock signal on the lock signal line 121 is at the low level, it returns to S201, and the controller resends the second clock training data to each source driver, controls the source driver to perform the clock recovery operation, and transmits the mixed data packet when the lock signal on the lock signal line 121 is at the high level.

S204, each source driver sends a fifth answer signal to the controller via the second data transmission channel.

Each source driver receives the mixed data packet and sends the fifth answer signal to the controller. For each source driver, the source driver outputs the fifth answer signal maintains the lock signal to be at the high level after successfully receiving the mixed data packet. When a source driver fails to receive a mixed data packet, the output fifth answer signal causes the lock signal to become at the low level.

When the fifth answer signal output from any source driver causes the lock signal to be at the low level, it causes the lock signal on the lock signal line 121 to become at the low level. Returning to S201 when the lock signal is at the low level, the controller resends the second clock training data to each of the source drivers, controls the source driver to perform the clock recovery operation, and transmits the mixed data packet when the lock signal on the lock signal line 121 is at the high level.

When the fifth answer signals output by the source drivers each cause the lock signal to be at the high level, the lock signal on the lock signal line 121 is maintained at a high level, it proceeds to S205.

S205, the controller sends a first feedback request to the first source driver via the second data transmission channel, receives the first feedback response sent by the first source driver via the second data transmission channel, and generates a first feedback request for the second source driver when no abnormality is detected, and so on, until it completes sending the first feedback requests for all source drivers.

The abnormality may be that a noise signal is detected in the drive system, or, the lock signal is at the low level. No detected abnormality means that the lock signal is at the high level and no noise signal is detected.

When no abnormality is detected, the controller sends a first feedback request to the first source driver SDIC0 via the second data transmission channel 302, and the first feedback request is used for requesting to obtain an operation state of the backlight unit 160. The first source driver SDIC0 sends a first feedback response to the controller via the second data transmission channel 302, the first feedback response includes feedback data, and the feedback data is used to characterize the operation state of the backlight unit 160. When no abnormality is detected, the controller continues to send the first feedback request to the second source driver SDIC1 via the second data transmission channel 302, and the second source driver SDIC1 sends the first feedback response to the controller via the second data transmission channel 302, and so on until the controller sends the first feedback request to the last source driver SDICN via the second data transmission channel 302, and the last source driver SDICN sends the first feedback response to the controller via the second data transmission channel 302.

After receiving the first feedback responses sent by all the source drivers, it jumps to S203 and the controller outputs the next mixed data packet.

As shown in Table 2, the data structure of the first feedback request includes a data packet type and data packet data, the data packet type is used to characterize the data as a feedback request, and the data packet data is an identifier SDIC ID of the source driver.

TABLE 2

| Data structure of first feedback request | |
|---|---|
| Data packet type | Data packet data |
| 0 | SDIC ID |

As shown in Table 3, the data structure of the first feedback response includes a data packet type and data packet data, the data packet type is used to characterize the data as a feedback response, and the data packet data is the identifier SDIC ID of the source driver, the feedback data length, and the feedback data.

TABLE 3

| Data structure of first feedback response | | | |
|---|---|---|---|
| Data packet type | Data packet data | | |
| 1 | SDIC ID | Feedback data length | Feedback data |

In the above technical solution, the controller sends the second clock training data to each source driver via the first data transmission channel 301 to cause each source driver to perform the clock recovery operation, and when each source driver performs a successful clock recovery operation, it transmits the mixed data packet via the first data transmission channel 301 to realize the synchronized transmission of image data and local dimming data. After transmitting a frame of image data and corresponding local dimming data, when no abnormality is monitored, the first feedback request is sent to each source driver in turn to obtain the operation state data of the backlight unit 160 collected by each source driver from the LED driver, realizing feedback of the operation state data of the backlight unit 160 from the source drivers to the controller. There is no need to set up the dimming controller 130 to collect the operation state data of the backlight unit 160 as well as to send the local dimming data, which ensures the synchronized transmission of the image data and the local dimming data, and also reduces the hardware cost.

Figure 12B:
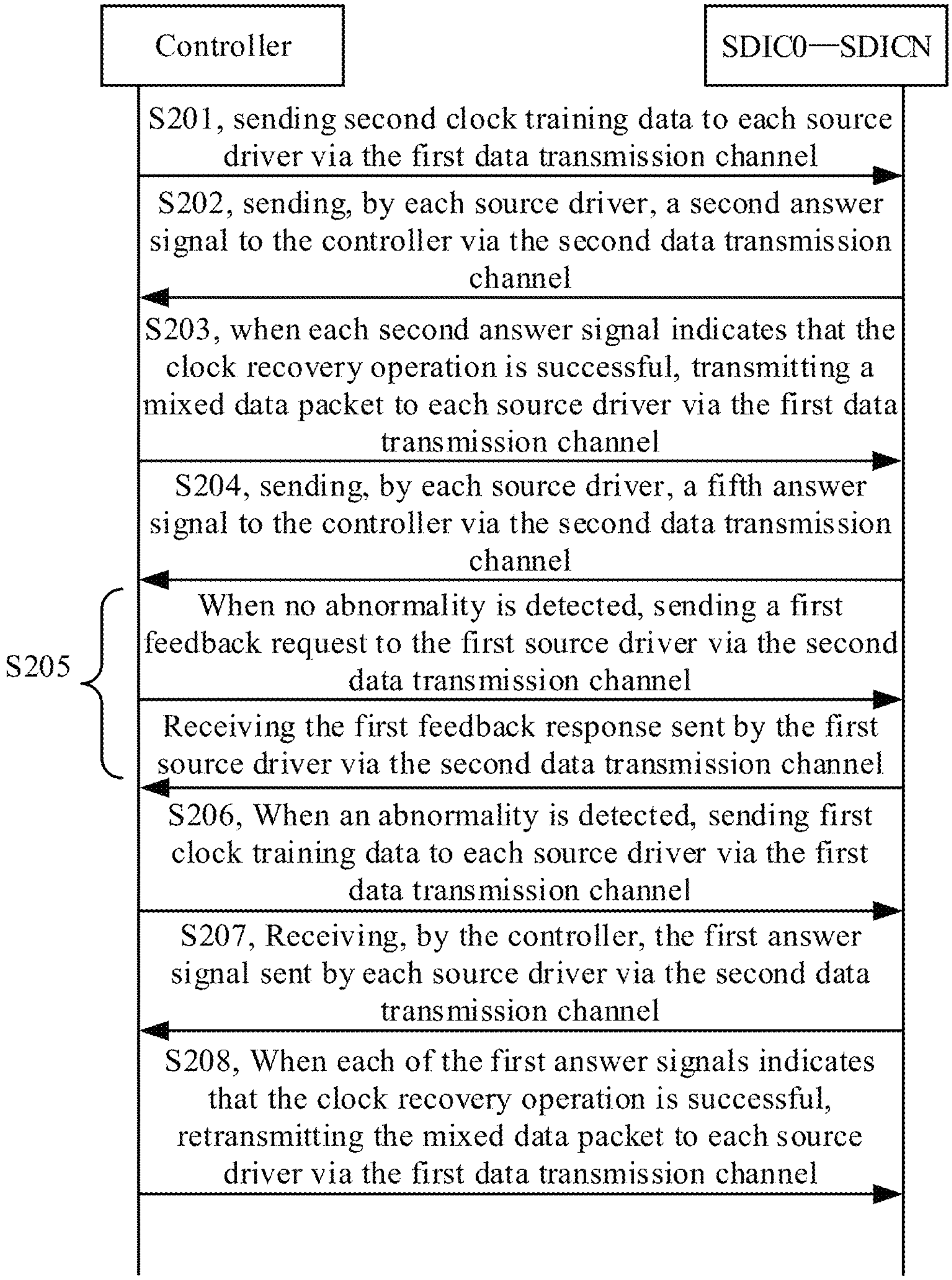
FIG. 12B is an interaction flowchart of a data transmission method provided in an embodiment of the present application.

In some embodiments, referring to FIGS. 12B and 13, the data transmission method further includes the following steps.

S206, when an abnormality is detected, the controller sends first clock training data to each source driver via the first data transmission channel.

Whether an abnormality occurs is detected when the controller sends the first feedback request to each source driver in turn, and when each source driver sends the first feedback response to the controller.

Detecting an abnormality means that the controller detects whether the lock signal is at the low level on the lock signal line 121, detects whether there is noise on the lock signal line 121 or detects whether there is noise on the data transmission channel of the P2P protocol.

The abnormality affects the transmission of the mixed data packet as well as the transmission of the feedback data, so when the abnormality occurs, it is necessary to re-perform the clock recovery operation before transmitting the mixed data packet and the feedback data.

When the abnormality is detected, the controller sends first clock training data to each source driver via the first data transmission channel 301 to cause each source driver to perform the clock recovery operation.

S207, each source driver sends the first answer signal to the controller via the second data transmission channel.

S208, when each of the first answer signals indicates that the clock recovery operation is successful, the controller retransmitting the mixed data packet to each source driver via the first data transmission channel.

In the above-described technical solution, when an abnormality is detected, the controller resends the first clock training data to each source driver via the first data transmission channel 301, the clock recovery operation is performed, and the mixed data packet is retransmitted, which ensures the accuracy of the data transmission with a self-correcting function and improves the robustness of the data transmission.

Figure 14A:
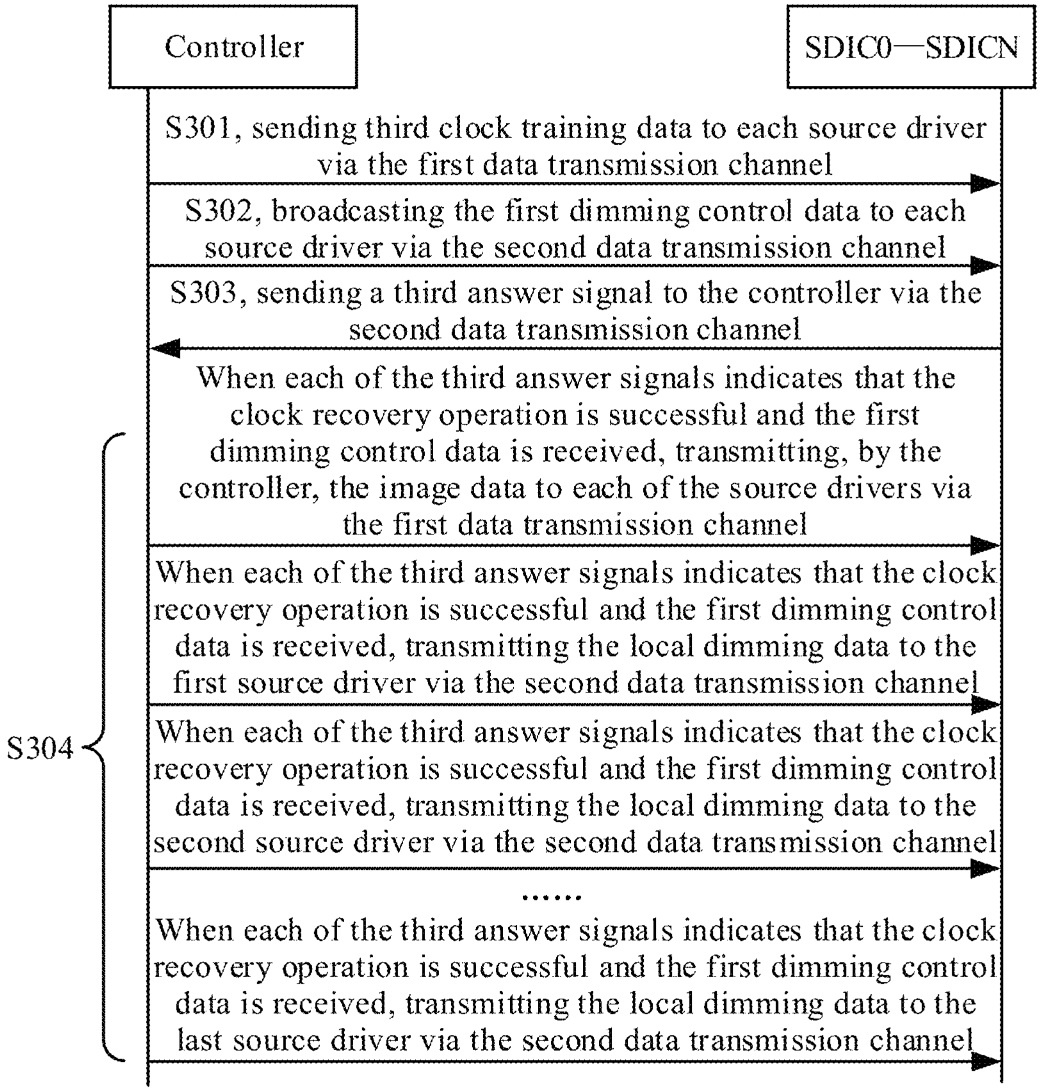
FIG. 14A is an interaction flowchart of a data transmission method provided in another embodiment of the present application.
Figure 14B:
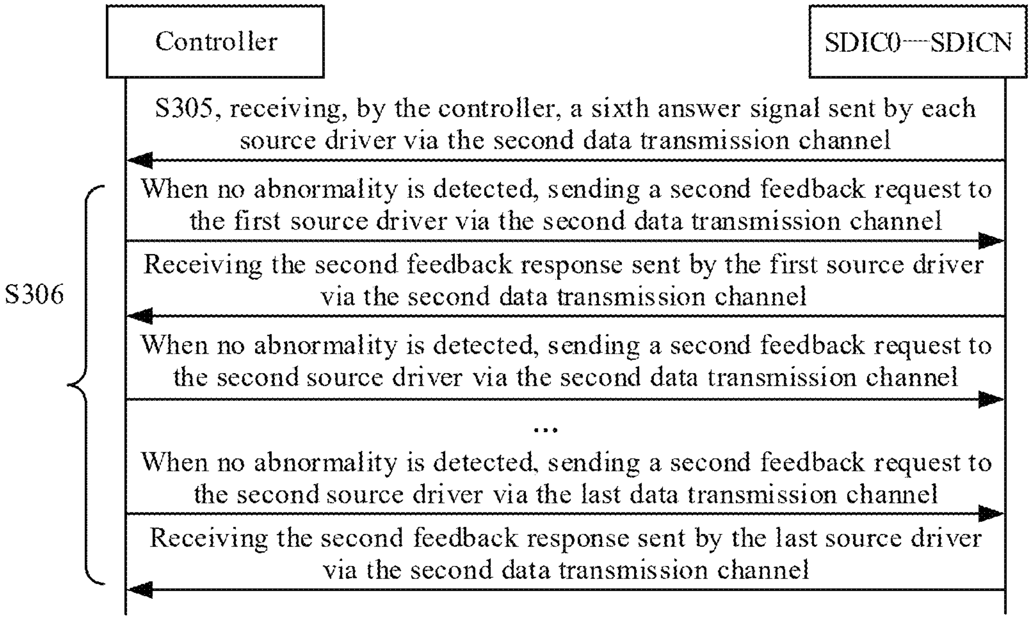
FIG. 14B is an interaction flowchart of a data transmission method provided in another embodiment of the present application.
Figure 15:
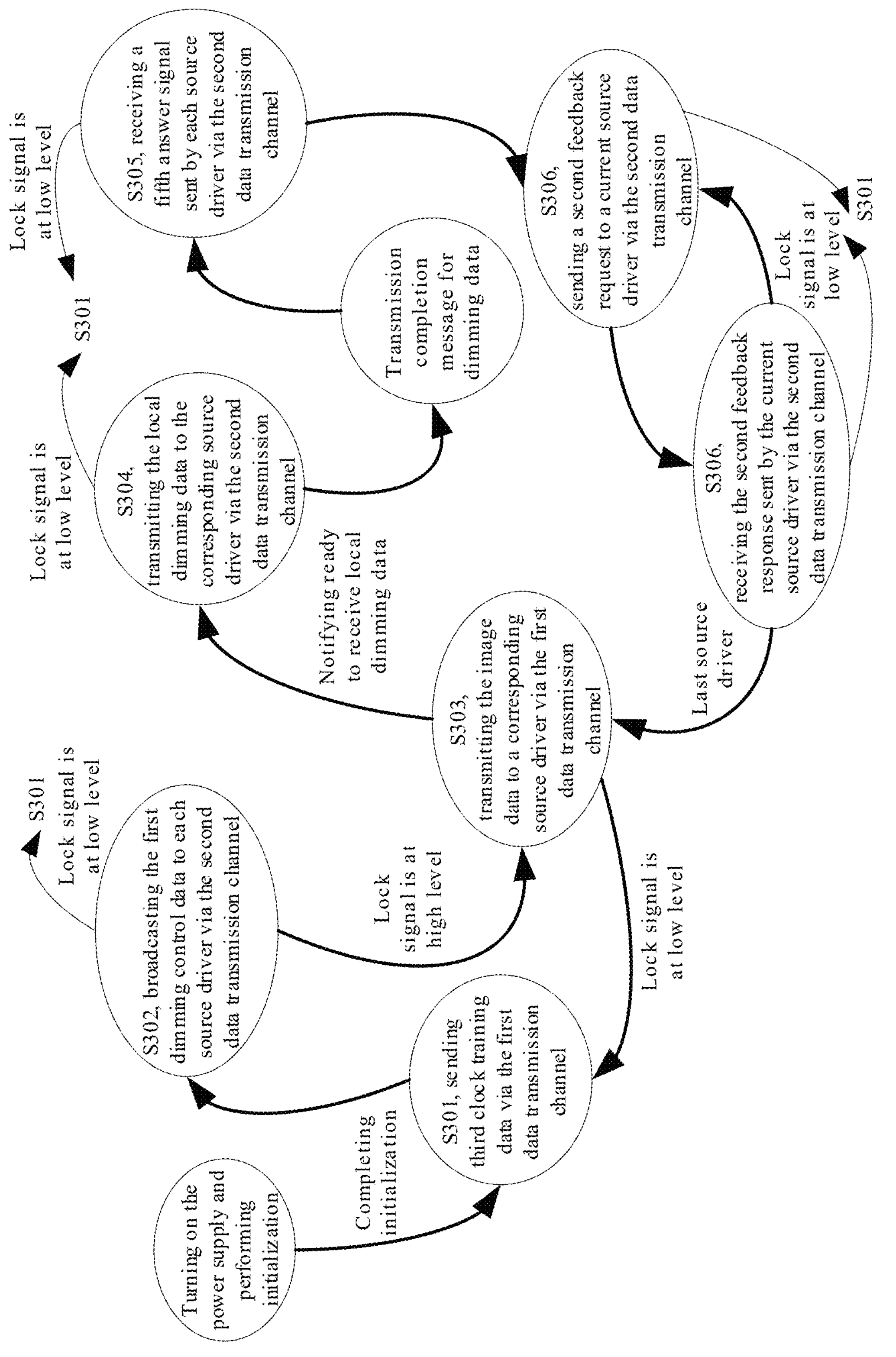
FIG. 15 is a state transition diagram of the data transmission method in the embodiments shown in FIG. 14A, FIG. 14B, and FIG. 14C.

As shown in FIG. 14A, FIG. 14B, and FIG. 15, an embodiment of the present application provides a data transmission method, where the data transmission method is applied to a drive system, and the method includes the following.

S301, the controller sends third clock training data to each source driver via the first data transmission channel.

The power supply is turned on and initialization is performed, so that the lock signal on the lock signal line 121 is at the low level.

The controller sends the third clock training data to each source driver via the first data transmission channel 301 to cause each source driver to perform clock recovery.

S302, the controller broadcasts the first dimming control data to each source driver via the second data transmission channel.

After receiving the first dimming control data, each source driver is configured according to the first dimming control data so that the configured source driver can control the LED driver.

As shown in Table 4, a data structure for broadcasting first dimming control data includes a data packet type and data packet data, the data packet type is used to characterize the broadcasting of the first dimming control data, and the data packet data is a dimming control data length and a dimming control data content.

TABLE 4

| Data structure for broadcasting first dimming control data | | |
|---|---|---|
| Data packet type | Data packet data | |
| 0 | Dimming control data length | Dimming control data content |

The order of S301 and S302 is reversible.

S303, each source driver sends a third answer signal to the controller via the second data transmission channel.

Each source driver, after receiving the first dimming control data and the third clock training data, performs the clock recovery operation based on the third clock training data.

For each source driver, after the source driver successfully receives the first dimming control data and successfully performs the clock recovery operation, the output third answer signal maintains the lock signal at the high level. Upon a failure of the source driver to receive the first dimming data or a failure to perform the clock recovery operation, the third answer signal output causes the lock signal to become at the low level.

Under the control of the third answer signals output from all the source drivers, if the lock signal is at the low level, it returns to S301, the controller retransmits the third clock training data to each of the source drivers via the first data transmission channel 301 as well as broadcasts the first dimming control data to each of the source drivers via the second data transmission channel 302, to control the source driver to perform the clock recovery operation and to be configured based on the first dimming control data, and transmits the image data and the local dimming data when the lock signal on the lock signal line 121 is at the high level.

S304, when each of the third answer signals indicates that the clock recovery operation is successful and the first dimming control data is received, the controller transmits the image data to each of the source drivers via the first data transmission channel, and transmits the local dimming data to each of the source drivers in turn via the second data transmission channel.

If there is no fault when each source driver is performing the clock recovery operation and the reception of the first dimming control data, the controller transmits the image data to each source driver via the first data transmission channel 301. After completing or during the transmission of the image data, the local dimming data is calculated in real time based on the image data, the local dimming data is transmitted sequentially to each source driver via the second data transmission channel 302, and a transmission completion message is sent after the local dimming data is sent to the last source driver.

For example, the local dimming data is first transmitted to the first source driver SDIC0, then the local dimming data is transmitted to the second source driver SDIC1, and so on, and finally, the local dimming data is transmitted to the last source driver SDICN.

As shown in Table 5, the data structure for transmitting the local dimming data includes a data packet type and data packet data, the data packet type is used to characterize the local dimming data, and the data packet data is an identifier SDIC ID of the source driver, the length of the local dimming data, and the content of the local dimming data. The content of the local dimming data contains a plurality of local dimming sub-data. The plurality of local dimming sub-data corresponds one-to-one with a plurality of dimming regions 202 on the same row. The correspondence has been described in the explanation of Table 1 and will not be described herein.

TABLE 5

| Transmission of local dimming data | | | |
|---|---|---|---|
| Data packet type | Data packet data | | |
| 1 | SDIC ID | Length of local dimming data | Content of local dimming data |

As shown in Table 6, the structure of the transmission completion message contains only the data packet type, and the data packet type is a completion message that the transmission of the local dimming data has been completed.

TABLE 6

| Transmission completion message Data packet type |
|---|
| 2 |

In the process of transmitting the image data, if there is a transmission fault that causes a certain source driver to be unable to successfully receive image data, this source driver drives the lock signal to be at the low level and it returns to S302 when the lock signal is at the low level.

In the process of transmitting the local dimming data, if there is a transmission fault that causes a certain source driver to be unable to successfully receive the local dimming data, this source driver drives the lock signal to be at the low level and it returns to S302 when the lock signal is at the low level.

S305, the controller receives a sixth answer signal sent by each source driver via the second data transmission channel.

Each source driver receives the local dimming data and then sends the sixth answer signal to the controller. For each source driver, the output sixth answer signal after the source driver successfully receives the local dimming data maintains the lock signal at the high level. When the source driver fails to receive the local dimming data, the output sixth answer signal causes the lock signal to become at the low level.

Under the control of the sixth answer signals output from all the source drivers, if the lock signal is at the low level, it returns to S301, the controller sends the third clock training data and the first dimming control data to each of the source drivers, to control the source driver to perform clock recovery and to be configured based on the first dimming control data, and transmits the image data and the local dimming data when all the received third answer signals indicates that the clock recovery operation is successful and the first dimming control data is received, that is, when the lock signal on the lock signal line 121 is at the high level.

S306, a second feedback request is sent to the first source driver via the second data transmission channel, the second feedback response sent by the first source driver via the second data transmission channel is received, and a second feedback request for the second source driver is generated when no abnormality is detected, and so on, until the sending of the second feedback request for all source drivers is completed.

The abnormality may be that a noise signal is detected in the drive system, or, the lock signal is at the low level. No detected abnormality means that the lock signal is at the high level and no noise signal is detected.

When no abnormality is detected, the controller sends a second feedback request to the first source driver SDIC0 via the second data transmission channel 302, and the second feedback request is used to monitor the operation state of the backlight unit 160. The first source driver SDIC0 sends a second feedback response to the controller via the second data transmission channel 302, the second feedback response includes feedback data, and the feedback data is used to characterize the operation state of the backlight unit 160. When no abnormality is detected, the controller sends a second feedback request to the second source driver SDIC1 via the second data transmission channel 302, and the second source driver SDIC1 sends the second feedback response to the controller via the second data transmission channel 302, and so on until a second feedback request is sent to the last source driver SDICN via the second data transmission channel 302, and the last source driver SDICN sends a second feedback response to the controller via the second data transmission channel 302.

After receiving the second feedback responses sent by all the source drivers, it jumps to S304, the controller outputs the next frame of image data and local dimming data corresponding to the image data.

In the process of the controller sending the second feedback request to each source driver or receiving the second feedback response sent by each source driver, if there is a transmission fault that causes a certain source driver to be unable to successfully receive the second feedback request or unable to send the second feedback response, the source driver drives the lock signal to be at the low level, and it returns to S302 when the lock signal is at the low level.

As shown in Table 7, the data structure of the second feedback request includes a data packet type and data packet data, the data packet type is used to characterize the data as a feedback request, and the data packet data is an identifier SDIC ID of the source driver.

TABLE 7

| Data structure of the second feedback request | |
|---|---|
| Data packet type | Data packet data |
| 0 | SDIC ID |

As shown in Table 8, the data structure of the second feedback response includes the data packet type and the data packet data, the data packet type is used to characterize the data as a feedback response, and the data packet data is the identifier SDIC ID of the source driver, the feedback data length, and the feedback data.

TABLE 8

| Data structure of the second feedback response | | | |
|---|---|---|---|
| Data packet type | Data packet data | | |
| 1 | SDIC ID | Feedback data length | Feedback data |

In the above technical solution, the controller sends the third clock training data to each source driver via the first data transmission channel 301, so that each source driver performs the clock recovery operation, and the controller also broadcasts the first dimming control data to each source driver via the second data transmission channel 302, so that each source driver is configured based on the first dimming data, so that the source driver can control the LED driver. When each source driver performs the clock recovery operation successfully and receive the first dimming control data, the image data is transmitted via the first data transmission channel 301, and the local dimming data is calculated in real time based on the image data, and when the calculation of the local dimming data is completed, the local dimming data is sent to each source driver via the second data transmission channel 302 to realize the synchronized transmission of the image data and the local dimming data. After transmitting a frame of image data and the corresponding local dimming data, when no abnormality is monitored, the feedback request is sent to each source driver in turn, and the operation state data of the backlight unit 160 collected by each source driver from the LED driver is obtained, which realizes the feedback of the operation state data of the backlight unit 160 from the source drivers to the controller. There is no need to set up the dimming controller 130 to collect the operation state data of the backlight unit 160 as well as to send the local dimming data, which ensures the synchronized transmission of the image data and the local dimming data, and also reduces the hardware cost.

Figure 14C:
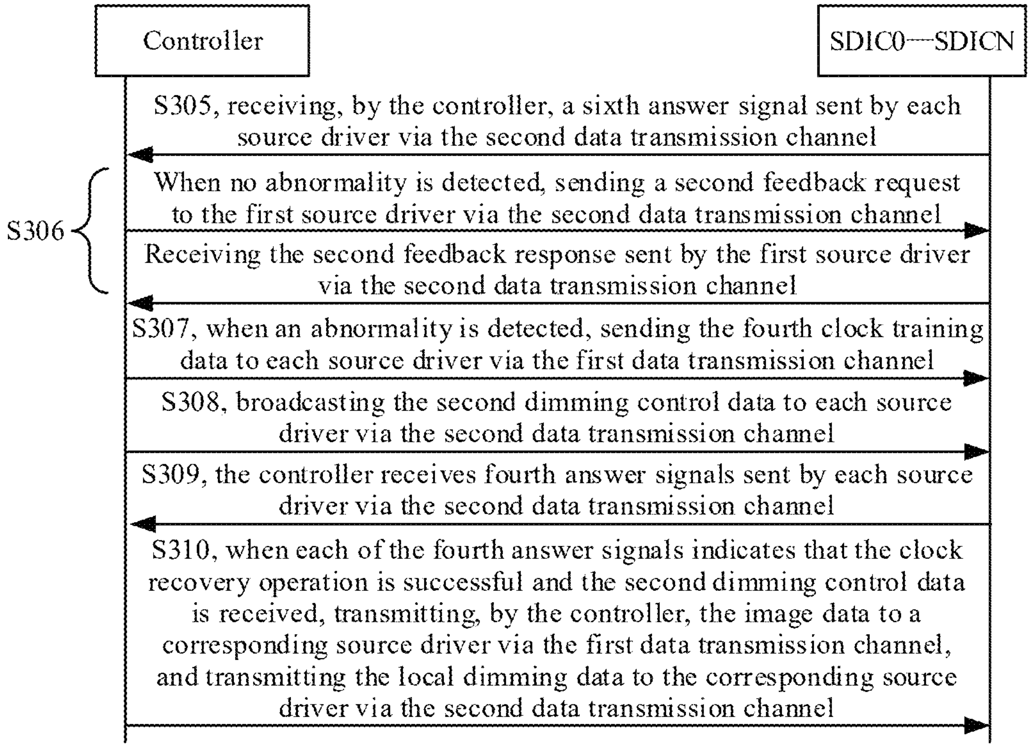
FIG. 14C is an interaction flowchart of a data transmission method provided in another embodiment of the present application.

In some embodiments, referring to FIG. 14C and FIG. 15, the data transmission method further includes the following steps.

S307, when an abnormality is detected, the controller sends the fourth clock training data to each source driver via the first data transmission channel.

Whether an abnormality occurs is detected when the controller sequentially sends the second feedback request to each source driver, and when each source driver sends the second feedback response to the controller.

Detecting an abnormality means that the controller detects whether the lock signal is at the low level on the lock signal line 121, detects whether there is noise on the lock signal line 121 or detects whether there is noise on the data transmission channel of the P2P protocol.

The abnormality affects the transmission of the mixed data packet as well as the transmission of the feedback data, so when the abnormality occurs, it is necessary to re-perform the clock recovery operation before transmitting the image data, the local dimming data, and the feedback data.

When the abnormality is detected, the controller sends the fourth clock training data to each source driver via the first data transmission channel 301 to cause each source driver to perform the clock recovery operation.

S308, the controller broadcasts the second dimming control data to each source driver via the second data transmission channel.

The structure of the second dimming data is the same as the structure of the first dimming data and is not described herein. After receiving the second dimming control data, each source driver is configured based on the second dimming control data so that the source driver can control the LED driver.

S309, the controller receives fourth answer signals sent by all the source drivers via the second data transmission channel.

S310, when each of the fourth answer signals indicates that the clock recovery operation is successful and the second dimming control data is received, the controller transmits the image data to each of the source drivers via the first data transmission channel, and transmits the local dimming data to each of the source drivers in turn via the second data transmission channel.

In the above technical solution, when the abnormality is detected, the controller resends the fourth clock training data to each source driver via the first data transmission channel 301, and broadcasts the second dimming control data to each source driver via the second data transmission channel 302, carries out the clock recovery and drive configuration, and retransmits the image data and the local dimming data, which ensures the accuracy of the data transmission with a self-correcting function and improves the robustness of the data transmission.

An embodiment of the present application provides a controller, including: a processor, and a memory communicatively connected to the processor.

The memory is configured to store computer execution instructions. The processor is configured to execute the computer execution instructions stored in the memory to realize the data transmission method in the above embodiment.

Optionally, the memory described above may be either stand-alone or integrated with the processor. When the memory is stand-alone, the controller further includes a bus for connecting the memory to the processor.

The controller provided in this embodiment may be used to perform the above-described data transmission method in a similar manner of realization and technical effect, and this embodiment will not be repeated herein.

Other embodiments of the present application will readily come to mind to those skilled in the art upon consideration of the specification and practice of the invention disclosed herein. The present application is intended to cover any variations, uses, or adaptations that follow the general principles of the present application and include common knowledge or customary technical means in the art not disclosed herein. The specification and embodiments are to be regarded as exemplary only, and the true scope and spirit of the present application is indicated by the following claims.

It is to be understood that the present application is not limited to the precise structure which has been described above and illustrated in the accompanying drawings, and that various modifications and changes may be made without departing from its scope. The scope of the present application is limited only by the appended claims.

What is claimed is:

1. A data transmission method, performed by a controller, wherein the controller and a plurality of source drivers are comprised in a drive system, a first data transmission channel is provided between the controller and each of the source drivers, and the method comprises:

obtaining, by the controller, image data corresponding to each of the source drivers and local dimming data corresponding to each of the source drivers;

transmitting, by the controller, the image data to each of the source drivers via the first data transmission channel and the local dimming data to each of the source drivers via the first data transmission channel; and traversing, by the controller, the source drivers, and performing, by the controller, following steps sequentially for each of the source drivers:

at step a, sending, by the controller, a first feedback request to a current source driver via a second data transmission channel and receiving, by the controller, a first feedback response from the current source driver via the second data transmission channel, wherein the second data transmission channel is provided between the controller and each of the source drivers; and at step b, determining, by the controller, whether a next source driver exists when no abnormality is detected, and in response to that the next source driver exists, generating, by the controller, a first feedback request to the next source driver and jumping to the step a.

2. The method according to claim 1, wherein the transmitting, by the controller, the image data to each of the source drivers via the first data transmission channel and the local dimming data to each of the source drivers via the first data transmission channel, comprising:

transmitting, by the controller, a mixed data packet to each of the source drivers via the first data transmission channel; wherein the mixed data packet comprises the image data and the local dimming data.

3. The method according to claim 2, wherein the mixed data packet comprises a plurality of sub-data packets, each of the sub-data packets comprising a plurality of first data packets and a second data packet; wherein the first data packet comprises the image data, and the second data packet comprises the image data and the local dimming data; and a plurality of dimming regions controlled by the image data comprised in each of the sub-data packets is referred to as a display region, a region in which a backlight source is located is referred to as a backlight region, and the backlight source is controlled by the local dimming data comprised in each of the sub-data packets; wherein a projection of the display region on the backlight region coincides with the backlight region.

4. The method according to claim 3, wherein each second data packet comprises a second packet header, a second packet body and the local dimming data; and in the second data packet, the local dimming data is inserted in the second packet header, and a length of the second packet header after insertion of the local dimming data is the same as a length of the second packet header before insertion of the local dimming data.

5. The method according to claim 4, wherein the local dimming data comprises a dimming start identifier, a plurality of local dimming sub-data, and a dimming end identifier; wherein the plurality of local dimming sub-data correspond one-to-one with a plurality of dimming regions on the same row.

6. The method according to claim 3, wherein each second data packet comprises a second packet header, a second packet body and the local dimming data; and in the second data packet, the local dimming data is inserted in the second packet body; wherein a length of the second packet body after insertion of the local dimming data is greater than a first normative value and a length of a packet header in a data packet located behind the second data packet is less than a second normative value, and a total length of the first packet body of the second data packet and the packet header in the data packet located behind the second data packet is a sum of the first normative value and the second normative value; and the first normative value is a length of the second packet body before insertion of the local dimming data, and the second normative value is a length of the packet header in the data packet located behind the second data packet before insertion of the local dimming data.

7. The method according to claim 2, wherein before the transmitting, by the controller, the mixed data packet to each of the source drivers via the first data transmission channel, the method further comprises:

transmitting second clock training data to each of the source drivers via the first data transmission channel;

receiving, via the second data transmission channel, a second answer signal sent by each of the source drivers after each of the source drivers performs a clock recovery operation based on the second clock training data; and accordingly, the transmitting, by the controller, the mixed data packet to each of the source drivers via the first data transmission channel comprises:

transmitting the mixed data packet to each of the source drivers via the first data transmission channel when each second answer signal indicates a successful clock recovery operation.

8. The method according to claim 1, wherein when an abnormality is detected, the method further comprises:

sending first clock training data to each of the source drivers via the first data transmission channel;

receiving, via the second data transmission channel, a first answer signal sent by each of the source drivers after each of the source drivers performs a clock recovery operation based on the first clock training data; and re-transmitting the mixed data packet to each of the source drivers via the first data transmission channel when each first answer signal indicates a successful clock recovery operation.

9. A data transmission method, performed by a controller, wherein the controller and a plurality of source drivers are comprised in a drive system, a first data transmission channel and a second data transmission channel are provided between the controller and each of the source drivers, and the method comprises:

obtaining, by the controller, image data corresponding to each of the source drivers and local dimming data corresponding to each of the source drivers; and transmitting, by the controller, the image data to each of the source drivers via the first data transmission channel and the local dimming data to each of the source drivers via the second data transmission channel; and traversing, by the controller, the source drivers, and performing, by the controller, following steps sequentially for each of the source drivers:

at step c, sending, by the controller, a second feedback request to a current source driver via the second data transmission channel and receiving, by the controller, a second feedback response from the current source driver via the second data transmission channel; and at step d, determining, by the controller, whether a next source driver exists when no abnormality is detected, and in response to that the next source driver exists, generating, by the controller, a second feedback request to the next source driver and jumping to the step c.

10. The method according to claim 9, wherein before the transmitting, by the controller, the image data to each of the source drivers via the first data transmission channel and the local dimming data to each of the source drivers via the second data transmission channel, the method further comprises:

transmitting, by the controller, third clock training data to each of the source drivers via the first data transmission channel;

broadcasting, by the controller, first dimming control data to each of the source drivers via the second data transmission channel;

receiving, by the controller, via the second data transmission channel, a third answer signal sent by each of the source drivers after each of the source drivers performs a clock recovery operation based on the third clock training data; and accordingly, the transmitting, by the controller, the image data to each of the source drivers via the first data transmission channel and the local dimming data to each of the source drivers via the second data transmission channel comprises:

when each third answer signal indicates a successful clock recovery operation and the first dimming control data is received, transmitting, by the controller, the image data to each of the source drivers via the first data transmission channel and the local dimming data to each of the source drivers sequentially via the second data transmission channel.

11. The method according to claim 9, wherein when an abnormality is detected, the method further comprises:

sending, by the controller, fourth clock training data to each of the source drivers via the first data transmission channel;

broadcasting, by the controller, second dimming control data to each of the source drivers via the second data transmission channel;

receiving, by the controller, via the second data transmission channel, a fourth answer signal sent by each of the source drivers after each of the source drivers performs a clock recovery operation based on the fourth clock training data; and when each fourth answer signal indicates a successful clock recovery operation and the second dimming control data is received, transmitting, by the controller, the image data to each of the source drivers via the first data transmission channel and the local dimming data to each of the source drivers via the second data transmission channel.

12. A controller, comprising: a processor, and a memory communicatively connected to the processor; wherein the memory is configured to store computer execution instructions; and the processor is configured to execute the computer execution instructions stored in the memory to implement the method according to claim 9.

13. A controller, comprising: a processor, and a memory communicatively connected to the processor; wherein the memory is configured to store computer execution instructions; and the processor is configured to execute the computer execution instructions stored in the memory to implement the method according to claim 1.

14. The controller according to claim 13, wherein the processor is configured to:

transmit, by the controller, a mixed data packet to each of the source drivers via the first data transmission channel; wherein the mixed data packet comprises the image data and the local dimming data.

15. The controller according to claim 14, wherein the mixed data packet comprises a plurality of sub-data packets, each of the sub-data packets comprising a plurality of first data packets and a second data packet; wherein the first data packet comprises the image data, and the second data packet comprises the image data and the local dimming data; and a plurality of dimming regions controlled by the image data comprised in each of the sub-data packets is referred to as a display region, a region in which a backlight source is located is referred to as a backlight region, and the backlight source is controlled by the local dimming data comprised in each of the sub-data packets; wherein a projection of the display region on the backlight region coincides with the backlight region.

16. The controller according to claim 15, wherein each second data packet comprises a second packet header, a second packet body and the local dimming data; and in the second data packet, the local dimming data is inserted in the second packet header, and a length of the second packet header after insertion of the local dimming data is the same as a length of the second packet header before insertion of the local dimming data.

17. The controller according to claim 16, wherein the local dimming data comprises a dimming start identifier, a plurality of local dimming sub-data, and a dimming end identifier; wherein the plurality of local dimming sub-data correspond one-to-one with a plurality of dimming regions on the same row.

18. The controller according to claim 15, wherein each second data packet comprises a second packet header, a second packet body and the local dimming data; and in the second data packet, the local dimming data is inserted in the second packet body; wherein a length of the second packet body after insertion of the local dimming data is greater than a first normative value and a length of a packet header in a data packet located behind the second data packet is less than a second normative value, and a total length of the first packet body of the second data packet and the packet header in the data packet located behind the second data packet is a sum of the first normative value and the second normative value; and the first normative value is a length of the second packet body before insertion of the local dimming data, and the second normative value is a length of the packet header in the data packet located behind the second data packet before insertion of the local dimming data.

* * * * *